United States Patent [19]

Ohtsuka

[11] Patent Number: 5,840,381

[45] Date of Patent: Nov. 24, 1998

[54] CORROSION INHIBITING LAMINATE SHEETS AND CONTAINERS

[75] Inventor: Ryochi Ohtsuka, Toyohashi, Japan

[73] Assignee: Aicello Chemical Co., Ltd., Aichi-ken, Japan

[21] Appl. No.: 638,087

[22] Filed: Apr. 25, 1996

[51] Int. Cl.⁶ .................................................. A47G 19/22

[52] U.S. Cl. ................... 428/34.4; 428/34.1; 428/474.4; 428/417.7; 428/480; 428/500; 428/523; 428/688; 428/910

[58] Field of Search .......................... 428/474.4, 477.7, 428/480, 500, 523, 910, 688, 34.1, 34.4

[56] References Cited

U.S. PATENT DOCUMENTS

| | | | |
|---|---|---|---|
| 4,212,674 | 7/1980 | Strauch | 106/14.05 |
| 4,518,429 | 5/1985 | Drake et al. | 106/14.39 |
| 5,139,700 | 8/1992 | Miksic et al. | 252/389.54 |
| 5,234,516 | 8/1993 | Okamura et al. | 156/82 |

*Primary Examiner*—E. Rollins Buffalow
*Attorney, Agent, or Firm*—Knobbe, Martens, Olson & Bear, LLP

[57] ABSTRACT

A laminate sheet having excellent corrosion-inhibiting effects and physical strength, which sheet is useful in packing metal products subjected to influence of changes in outside temperature and humidity, and which sheet is comprised of an inner layer made of a thermoplastic resin containing water-soluble glass powder and optionally a vapor phase corrosion inhibitor, a middle layer made of a thermoplastic resin containing inorganic metal salt corrosion inhibitor(s), and an outer layer made of a barrier resin with excellent barrier properties against outside air and against ultraviolet rays.

26 Claims, No Drawings

CORROSION INHIBITING LAMINATE SHEETS AND CONTAINERS

BACKGROUND OF THE INVENTION

1. Field of the Invention

The present invention relates to corrosion inhibiting laminate sheets.

The present invention also relates to laminate sheets to package metal products and containers to package metal products used for the purpose of package and storage of metal products requiring corrosion inhibiting.

2. Description of the Prior Art

Conventionally, technology to package metal products with thermoplastic resin sheets has been disclosed.

For example, corrosion inhibiting sheets (Japanese Patent Publications No. 47-4295 and No. 53-2449) which are prepared by addition of a vapor phase corrosion inhibitor such as dicyclohexyl ammonium nitrite and diisopropyl ammonium nitrite to thermoplastic resin followed by melt extrusion, and corrosion inhibiting sheets (Japanese Patent Publication No. 58-24270) in which a coating composition containing a vapor phase corrosion inhibitor is coated on the surface of the sheet, etc., are known.

Such a thermoplastic resin sheet is now utilized, since it is more transparent and easily heat-sealable as compared with corrosion inhibiting paper. Corrosion inhibition lasts for a short period of time, however, when metal products are packaged with the sheet containing a vapor phase corrosion inhibitor, since a corrosion inhibiting component is attached to or adsorbed onto the metal surface due to vaporization of the vapor phase corrosion inhibitor. There is also such a shortcoming that conditions under which rust is liable to occur are produced when a container is placed under conditions of high temperatures and humidity, since a region of a sheet contacting a metal product in a container tends to generate condensation due to a capillary phenomenon.

When a metal products with a high heat conductivity is contained and stored in a container, a temperature of the metal surface rapidly falls following a decrease in outside temperature, thus condensation is caused due to cooling by radiation heat from the metal surface. A vapor phase corrosion inhibitor placed in the container can prevent the condensation, resulting in inhibition of corrosion and discoloring of regions not contacting the container.

On the other hand, wood, ligneous materials, board, metals, etc., can be mentioned as packaging materials for metal products and metal parts. Generally, a container has been formed using these materials, in which metal products are contained for storage and transportation. This has been implemented since container package is convenient for transportation and effective for softening mechanical impact on the products themselves. However, if materials forming containers are insufficiently moisture-proof or water-proof or contain a large amount of moisture, they may have rather facilitated corrosion of packaged metal products.

For example, when wood is employed to form a container, a difference between temperature and humidity in the container and those of outside air together with a moisture content of wood accounting for about 30–250% (on dry basis) on average further increase humidity in the container. Consequently, wood is considerably unsuitable as packaging material for preventing rust.

It has been proposed to use wood chips solidified with thermosetting resins such as urea resin as ligneous material in order to overcome this disadvantage. Since formaldehyde is reacted to urea in an amount exceeding a bounding rate when urea resin is used for solidification of wood chips, however, insufficient thermosetting gradually break out free formaldehyde which is then oxidized by oxygen in the air to become formic acid. The formic acid thus produced in turn causes extensive corrosion of most metals. Consequently, this method is also in appropriate.

Cartons can represent containers formed using cardboard, which have such a fatal disadvantage that they cannot retain the strength under humid conditions. Use of cardboard with the surface subjected to water-proof treatment has been proposed. There remains problem in corrosion inhibiting itself, however, even when metal products are packaged or contained in the cardboard containers with the water-proof surface. Accordingly, it has been proposed to apply corrosion inhibiting oil on the surface of cardboard or the surface of metal products, or to place desiccants together in containers, in order to improve corrosion inhibiting. A lot of problems still remain in corrosion inhibiting and strength, however.

Metal products to be contained in containers are mainly those, of course, requiring corrosion inhibiting. For example, in the case of parts of automobiles, etc., for export which are to be integrated in import countries, since the metal parts are integrated in the import countries, it is important to prevent rust. Therefore, the surface of metal parts are generally treated with corrosion inhibiting oil prior to being placed in containers. Accordingly, an additional step to remove the corrosion inhibiting oil on the surface of metal products is required before assembly of the parts, which step deteriorate the work environment. As a result, workers tend to dislike handling products which have been subjected to corrosion inhibiting oil treatment and require removal of said oil.

Even when desiccants are used to absorb and remove moisture naturally existing inside a container, the desiccants are effective only for systems completely sealed at the time of introduction. If a container bears humid air, desiccants loose their dehumidifying potential and in turn begin to release absorbed moisture after several days have passed, which sometimes causes rust.

When the inner surface of a container touches the surface of a metal product, causing condensation of water, a differential aeration cell is formed by the action of oxygen dissolved in the condensed water in the contact region, the surface in the gap to which smaller amount of dissolved oxygen is provided works as cathode inhibitor against the free surface to which larger amount of oxygen is provided, and rust formation steadily proceeds. Thus, corrosion inhibiting cannot be achieved.

Although other attempts have been made to inhibit corrosion formation arising from condensed water in the contact region between the inner surface of a container and a metal product by using a water-soluble corrosion inhibiting agent such as sodium benzoate, a hydrolytic reaction occurred between the water-soluble corrosion inhibition and a vapor phase corrosion inhibitor owing to residual moisture in the container to induce early loss of the vapor phase corrosion inhibitors.

In addition, even when passive coating of nitrites is formed on the iron metal surface, the presence of corrosive factors such as chlorine ion destroys passivity through corroding to cause extensive corrosion on the metal surface. Particularly, in containers moulded from resin compositions comprising a vapor phase corrosion inhibitor with a high vaporization rate, the vapor phase corrosion inhibitor is spent through vaporization and thus the content in the resin is reduced over time. This creates a problem in corrosion inhibiting potential at the contact surface, in particular. This method is thus impractical.

No conventionally employed water-soluble corrosion inhibitor exhibit corrosion inhibiting effects commonly against a variety of metals. For example, sodium benzoate cannot be employed for general purposes, since it is effective for steel, but, on the contrary, it facilitates rust formation of non-ferrous metals such as aluminum and zinc.

Taking these circumstances into consideration, it has been sought to develop packaging materials which exhibit excellent corrosion inhibiting properties for all kinds of metal products contained, regardless of the kind of metal.

Now, the present inventor has found that thermoplastic resin composition sheets in which water-soluble glass powder is added, alone or together with a corrosion inhibitor, to thermoplastic resin has an excellent corrosion inhibiting property, and applied an invention relating to a corrosion inhibiting solution obtained from the resin composition and containers formed with the resin sheet in Japan, according to a finding that the sheet was effective for packaging metal products.

However, even with the use of corrosion inhibiting thermoplastic resin compositions mentioned above, there still remains problems in barrier properties against moisture, water, oxygen, and corrosive gases such as chlorine gas, mechanical strength, etc. This is not satisfactory, when metal is packaged or contained.

SUMMARY OF THE INVENTION

The present invention aims to provide corrosion inhibiting laminate sheets, particularly sheets used for packaging metal products, and containers formed with the laminate sheet, which can settle the problems not resolved by the prior art, that is, which retain corrosion inhibiting effect for metal parts and products for a long period of time, in which no reaction occurs between vapor phase corrosion inhibitors, which exhibit a general-purpose corrosion inhibiting effect, regardless of the type of metal, which display an excellent ability to vapor phase corrosion inhibiting gas and good mechanical strength, moulding properties of which are not deteriorated during formation of a container, and which also have an excellent barrier property against outside air.

The present inventor discovered that a corrosion inhibiting property more potent than expected was exhibited by the presence of an inorganic acid metal salt layer adjacent to a water-soluble glass powder layer.

That is, satisfactory corrosion inhibiting property can be obtained when metal is packaged with a laminate sheet comprising a thermoplastic resin sheet containing water-soluble glass powder and a thermoplastic resin sheet containing inorganic acid metal salt(s) or when metal is contained in a container formed with the laminate sheet. In this case, it is necessary, in particular, to place the sheet layer containing water-soluble glass powder as an inner layer facing the metal. Moreover, it is possible to further improve corrosion inhibiting property by using a sheet in which a vapor phase corrosion inhibitor is further added rather than a sheet solely consisting of water-soluble glass powder.

According to the present invention, similar corrosion inhibiting effect can be obtained by packaging a metal product with a laminate sheet comprising a thermoplastic resin sheet containing water-soluble glass powder and a thermoplastic resin sheet containing inorganic acid metal salt(s) so as to contact the sheet containing water-soluble glass powder with the metal product, and by forming a container using the laminate sheet in which a sheet containing water-soluble glass powder is placed on an inner side and containing a metal product in the container. In this case, similar corrosion inhibiting properties are exhibited as in the case of the packaging sheet by laminating a barrier resin layer as the most outer layer.

Corrosion inhibiting effect of the laminate sheet of the present invention is considered to be accomplished by dissolving water-soluble glass powder deposited on the inner surface of the package container in condensed water and adsorbing the glass component selectively onto the metal surface to form very thin glass coat, when condensation occurs on the surface of the packaged metal due to changes in temperature and humidity of outside air.

Therefore, when the concentration of water-soluble glass in the condensed water reaches a point of saturation concentration, water-soluble glass powder no longer dissolves and remains. At that time the solubility of water soluble glass can be freely controlled by changing the ratio of, for example, $B_2O_3$, $SiO_2$, and $Na_2O$. According to the present invention, sufficient corrosion inhibition can be achieved, when the solubility of water-soluble glass in water is 0.1 wt.% or higher.

Since these water-soluble glass powders are not subjected to thermal changes at a temperature of 400° C. or lower, a water-soluble corrosion inhibitor and a vapor phase corrosion inhibitor cause no chemical reaction. Therefore, only little adverse effects due to secondary chemical reactions should be considered, even if a combination of these compounds is contained in thermoplastic resin.

Suitable thermoplastic resins which can be mixed with the above-mentioned water-soluble glass powder alone or, optionally, in combination with a vapor phase corrosion inhibitor include but are not limited to the following, polyolefin resins, polystyrene resins, polyester resins, polyamide resins and vinyl chloride resins can be mentioned. As polyolefin resins, α-olefin homopolymers such as high-density polyethylene, straight low-density polyethylene, low-density polyethylene, polypropylene, butene-1, and pentene-1, and copolymers of ethylene and propylene with comonomers such as vinyl acetate and acrylic esters. A typical copolymer is ethylene-vinyl acetate copolymer (EVA).

Polystyrene resins include polystyrene, acrylonitrile-butadiene-styrene resin (ABS resin), and acrylonitrile-styrene resin (AS resin); polyester resins include polyethylene terephtalate, polybutylene terephtalate, and polyester copolymers comprising polybutylene terephtalate and poly (tetramethylene oxide) glycol; and polyamide resins include Nylon 6, Nylon 66, Nylon 610, Nylon 6/66, Nylon 12, Nylon 6/112, and amorphous nylon. Vinyl chloride resins include vinyl chloride, vinyl chloride/vinylidene chloride copolymer resin, vinylidene chloride resin, vinyl chloride/acrylonitrile copolymer, and ethylene/vinyl chloride copolymer.

Thermoplastic resins identical to or different from those mentioned above can be employed for a sheet forming the other layer to which inorganic acid metal salt(s) are added.

Water-soluble glass powder, the composition and particle size of which are controlled so that solubility in water becomes 0.1 wt.% or higher, is suitable for the present invention. The representative composition is a $B_2O_8$—$SiO_2$—$Na_2O$ system. Preferably, such powder with a particle size less than 100 μm is employed. Powder with a particle size smaller than 60 μm is more preferable. When water-soluble glass powder with solubility in water lower than 0.1 wt.% is employed, a sufficient effect cannot be exhibited.

According to the present invention, a vapor phase corrosion inhibitor is used together with water-soluble glass powder in the above-mentioned thermoplastic resin sheet solely consisting of water-soluble glass powder in order to enhance the corrosion inhibiting effect in the region not contacting metal. As the vapor phase corrosion inhibitor can be selected from the following or a combination thereof, but it is not limited to: dicyclohexyl ammonium nitrite, diisopropyl ammonium nitrite, nitronaphtaline ammonium nitrite, triammonium phosphate, ammonium hydrogen phosphate, ammonium molydenum, dicyclohexylamine phosphate, cyclohexylamine carbamate, ammonium benzoate, cyclohexylamine benzoate, ammonium phatalate, dicyclohexyl ammonium caprylate, cyclohexylamine laureate; heterocyclic amines and imine compounds, such as benzotriazole, methylbenzotriazole, 2-heptadecylimidazole, and thionalide; urea compounds, such as urea, thiourea, urotropin, phenyl carbamate; aromatic benzoates, such as sodium benzoate, zinc benzoate, and sodium phthalate.

According to the present invention, an inorganic acid metal salt layer adjacent to the above-mentioned thermoplastic resin layer containing water-soluble glass powder is a layer containing one or more metal salts selected from the group consisting of combinations of an inorganic acid selected from nitric acid, silicic acid, orthophosphoric acid, polyphosphoric acid, chromic acid, and carbonic acid with a metal selected from Na, Ca, Mg, K, and Zn.

When the above-mentioned corrosion inhibitor is employed as a mixture with water-soluble glass powder, reinforcing agents such as calcium carbonate, talc, mica, aluminum hydroxide, and glass fiber may be added, if required, or volatile foaming agents or chemical foaming agents may be added to provide a buffering action, depending on the application.

A sheet forming a barrier layer which serves as the most outer layer when metal is packaged is a sheet of resin with excellent barrier properties against moisture, water, oxygen, gases, etc. Polyester resins, polyamide resins, copolymer resins, ionomer resins, uniaxially and biaxially stretched polyolefin resins, vinylidene chloride resins, fluorocarbon resins, etc., are appropriate for this purpose.

When water-soluble glass powder and a vapor phase corrosion inhibitor and an inorganic acid metal salt are contained in thermoplastic resin, a means in which master batch pellets are prepared in advance is available by using resin pellets, powder, etc., by means of suitable kneading method such as Banbury mixer, mixing roll kneader, biaxial kneading extruder and then compounded with thermoplastic resin of the base material is available. They may be directly blended in the form of a resin compound followed by moulding into a sheet by means of inflation extrusion, T-die extrusion, solvent casting method, etc., as well.

In order to form laminates of the present invention consisting of a thermoplastic resin layer containing water-soluble glass powder and a vapor phase corrosion inhibitor and a thermoplastic resin layer containing inorganic acid metal salt(s), conventional processes for manufacturing laminates, such as co-extrusion and lamination using adhesives such as hot melt lamination, dry lamination, and wet lamination may be applied.

When a laminate consisting of a corrosion inhibiting resin sheet and a barrier layer is formed, and if the resin of the corrosion inhibiting resin sheet is the same as that of the barrier layer, it is not always required to use adhesives because of a natural affinity and a method in which the two layers are pressurized with heating to adhere each other may be utilized.

According to the present invention, in order to form a container from a corrosion inhibiting laminate sheet, the container is manufactured using the laminate sheet by a conventional secondary moulding means. Cardboard and a container of the present invention may be combined to be employed as a container form.

The present invention will be illustrated with reference to the following preferred embodiments.

DETAILED DESCRIPTION OF THE PREFERRED EMBODIMENTS

Embodiment 1

(Preparation of laminate sheets and corrosion inhibition test)

To powdered low-density polyethylene (Sumitomo Chemical Co., Ltd., Flothen G201, density=0.922, MI=6.0), 30 wt. % (based on total weight) of water-soluble glass powder (crushed to have a mean particle diameter of 40 μm) comprising $B_2O_3$, $SiO_2$, and $Na_2O$ at a ratio of 60 mol. %:20 mol. %:20 mol. % was added, respectively. The mixture was kneaded in a biaxial extruder at 160° C., cooled by cold air, and then passed through a pelletizer to prepare a water-soluble glass master batch.

Ten weight parts of the above-mentioned water-soluble glass master batch was added to 100 weight parts of low-density polyethylene (manufactured by Sumitomo Chemical Co., Ltd., F-213P, density=0.923, MI=1.5), and the mixture was thoroughly blended. The most inner layer with a thickness of 50 μm containing 2.1 wt. % of water-soluble glass powder was formed at an extruding temperature of 150° C. using a double-layer blown film extruder.

Additionally, 0.9 wt. % of sodium nitrite was added to 100 weight parts of low-density polyethylene (Sumitomo Chemical Co., Ltd., F-213P, density=0.923, MI=1.5), and the mixture was thoroughly blended to prepare raw material. The raw material was introduced into another extruder of the double-layer blown film extruder to form a double-layer laminate sheet with a total thickness of 100 μm consisting of the most inner layer with a thickness of 50 μm containing 2.1 wt. % of water-soluble glass powder and a layer with a thickness of 50 μm containing sodium nitrite by co-extrusion.

A metal product [D] was packaged with the laminate sheet and stored under the condition mentioned below. The results of the rust-prevention test are shown in Tables 1 and 2.

Embodiment 2

To the above-mentioned low-density polyethylene, 1.0 wt. % of dicyclohexyl ammonium nitrite was added as a vapor phase corrosion inhibitor crushed by a dry method, and a sheet with a thickness of 50 μm containing 2.1 wt. % of water-soluble glass powder as well was formed at a moulding temperature of 140° C. in the most inner layer of the double-layer extruder as in Embodiment 1.

Another layer containing the inorganic acid metal salt was also formed as in Embodiment 1, and a double-layer laminate sheet with a total thickness of 100 μm consisting of the most inner layer with a thickness of 50 μm containing 2.1 wt. % of water-soluble glass powder and 1.0 wt. % of dicyclohexyl ammonium nitrite and a layer with a thickness of 50 μm containing sodium nitrite by co-extrusion.

The metal product [D] was packaged with the laminate sheet and stored under the following conditions [C]. The results of the corrosion-inhibition test are shown in Tables 1 and 2.

Embodiment 3

The surface of the low-density polyethylene sheet containing sodium nitrite of the laminate sheet of Embodiment 1 was treated and a polyamide sheet with a thickness of 15 μm (Unitika Ltd., Emblem) was laminated by applying an organic solvent solution containing aromatic polyester adhesive agent while drying at 80° C.

A metal product [D] was packaged with the laminate sheet and stored under the following conditions [C]. The results of the corrosion-inhibition test are shown in Tables 1 and 2.

Embodiment 4

A 20 μm thickness high-density polyethylene sheet (Tonen Corp., density=0.954, MI=1.1) was laminated on the side of a 20 μm thickness low-density polyethylene sheet containing sodium nitrite of the laminate sheet of Embodiment 2 by passing through a heat roll to form a laminate sheet.

A metal product [D] was packaged with the laminate sheet and stored under the following conditions [C]. The results of the corrosion-inhibition test are shown in Tables 1 and 2.

Embodiment 5

To polypropylene resin (Mitsubishi Kasei Corp., 1501 F, density=0.90, MI=9.0), 20 wt. % (based on total weight) of water-soluble glass powder (crushed to have a mean particle diameter of 40 μm) comprising $B_2O_3$, $SiO_2$, and $Na_2O$ at a ratio of 60 mol.%:25 mol. %:15 mol. % was added, respectively. The mixture was kneaded in a Banbury mixer at 180° C. and then passed through a pelletizer to prepare water-soluble master batch.

39 weight parts of the master batch and 100 weight parts of the resin used above were thoroughly blended and a resin sheet with a thickness of 1.5 mm containing 5.6 wt.% of water-soluble glass was formed at a moulding temperature of 200° C. by T-die cast method.

Additionally, 0.9 wt. % of sodium nitrite was added to low-density polyethylene (Sumitomo Chemical Co., Ltd., F-213P, density=0.923, MI=1.5) and the mixture was thoroughly blended to prepare raw material. The raw material was melt-extruded onto the surface of the above-mentioned resin sheet containing water-soluble glass by the T-die cast method to form a resin sheet consisting of the layer with a thickness of 1.5 mm containing 5.6 wt. % of water-soluble glass powder and a layer with a thickness of 1.0 mm containing sodium nitrite.

The resin layer was heated to 150° C. and formed by vacuum moulding into a double-layer container with a mean thickness of 1.0 mm and a size of 200×200×100 mm which could contain 4 metal pieces shown in Table 1. A box cap with a mean thickness of 1.1 mm and a size of 205×205×200 mm was formed using the same resin by injection moulding at a moulding temperature of 180° C.

The 4 test pieces shown in Table 1 were introduced in the container, positioned so as to maximize the area of contact with the container, and stored under the test environment mentioned below.

A metal product [D] was packaged with the container and stored under the test conditions mentioned below. The results of the corrosion inhibition test are shown in Tables 1 and 2.

Comparative Embodiment 1

A sheet with a thickness of 100 μm was formed using the low-density polyethylene (Sumitomo Chemical Co., Ltd., F-213P, density=0.923, MI=1.5) by an inflation method at a moulding temperature of 150° C.

A metal product [D] was packaged with the laminate sheet and stored under the following conditions. The results of the corrosion-inhibition test are shown in Tables 1 and 2.

Comparative Embodiment 2

To the low-density polyethylene (employed in Embodiments 1 and 2, and Comparative Embodiment 1), 1.0 wt. % of dicycl6hexyl ammonium nitrite was added as a vapor phase corrosion inhibitor crushed by the dry method. Then, a sheet with a thickness of 50 μm was formed in the most inner layer of the double-layer extruder at a moulding temperature of 140° C. as in Embodiment 1.

The other layer containing the inorganic acid metal salt was also formed as in Embodiments 1 and 2. A double-layer laminate sheet with a total thickness of 100 μm consisting of a 50 μm thickness inner layer containing 1.0 wt. % of dicyclohexyl ammonium nitrite as a vapor phase corrosion inhibitor and a 50 μm thickness outer layer with a thickness of 50 μm containing sodium nitrite by co-extrusion.

A metal product [D] was packaged with the container and stored under the following conditions. The results of the corrosion-inhibition test are shown in Tables 1 and 2.

Comparative Embodiment 3

A resin layer with a thickness of 1.5 mm containing 5.6 wt. % of water-soluble glass was prepared using the polypropylene resin (Mitsubishi Kasei Corp., 1501F, density=0.90, MI=9.0) employed in Embodiment 5 by the T-die cast method at a moulding temperature of 200° C.

Additionally, 0.9 wt. % of sodium nitrite was added to 100 weight parts of low-density polyethylene (Sumitomo Chemical Co., Ltd., F-213P, density=0.923, MI=1.5), and the mixture was thoroughly blended to prepare raw material. The raw material was melt-extruded onto the surface of the above-mentioned polypropylene resin layer by the T-die cast method to form a resin layer consisting of the layer with a thickness of 1.5 mm and a layer with a thickness of 1.0 mm containing sodium nitrite. The resin layer was heated to 150° C. and formed by vacuum moulding into a double-layer container of the same size as in Embodiment 5 which could contain the 4 metal pieces shown in Table 1.

A box cap of the same size as in Embodiment 5 was formed by injection moulding method at a moulding temperature of 180° C. by using the same resin as above.

The 4 test pieces shown in Table 1 were introduced in the container, positioned a so as to maximize the area of contact with the container and left under the test environment mentioned below.

A metal product [D] was packaged with the container and stored under the following conditions. The results of the corrosion-inhibition test are shown in Tables 1 and 2.

The corrosion inhibition tests were conducted as follows.

A. Contact Corrosion-inhibition Test

A bag with a size of 60×90 mm was prepared using each sheet and subjected to ultrasonic cleaning with solvent naphtha. An air-dried cast iron test piece as described in [D] below was placed in each bag and sealed and placed under the test conditions [C] or—below and the incidence of rust appearance on the surface of the test pieces when left under the test conditions was evaluated.

In this test, since the test piece contacted the sheet, corrosion-inhibition effect on the contact region was evaluated.

In Embodiment 5 and Comparative Embodiment 3, evaluation was made for the noncontact surface.

B. Space Corrosion-inhibition Test

A test piece described in [D] below was suspended with a fishing line in a frame of 100 mm in length, 100 mm in width, and 150 mm in height and sealed in the prepared sheet subjected to gusset-seal. The test piece was stored under the test conditions..described below for 14 days (2 cycles/day, total of 28 cycles), and then the occurrence of rust on the surface was evaluated.

In Embodiment 5 and Comparative Embodiment 3, evaluation was made for the noncontact surface.

C. Test Conditions $C_1$; 50° C., >95%RH, 21 days
$C_2$; 25° C., 70%RH, 4 hours
25° C.–>50° C. temperature rise and humidity increase time; 2 hours
50° C., 95%RH, 4 hours
50° C.–>25° C. temperature rise and humidity increase time; 2 hours
(Total 12 hours/cycle, total 21 days; 42 cycles)

D. Test Piece

Cast iron, copper plate, nickel plated steel plate, and steel φ30×8 mm (JIS G 5501) provision Fe-25; The surface is subjected to lathe machining prior to use.

TABLE 1

Results of Contact Corrosion-inhibition Test

| Name of metal | Cast iron | Copper plate | Nickel plated steel plate | Steel |
|---|---|---|---|---|
| Embodiment 1 | ⊚ | ⊚ | ⊚ | ⊚ |
| Embodiment 2 | ⊚ | ⊚ | ⊚ | ⊚ |
| Embodiment 3 | ⊚ | ⊚ | ⊚ | ⊚ |
| Embodiment 4 | ⊚ | ⊚ | ⊚ | ⊚ |
| Embodiment 5 | ⊚ | ⊚ | ⊚ | ⊚ |
| Comparative Embodiment 1 | xx | xx | x | x |
| Comparative Embodiment 2 | Δ | xx | xx | ○ |
| Comparative Embodiment 3 | Δ | xx | xx | Δ |

TABLE 2

Results of Vapor Phase Corrosion-inhibition Test

| Name of metal | Cast iron | Copper plate | Nickel plated steel plate | Steel |
|---|---|---|---|---|
| Embodiment 1 | ○ | Δ | ○ | ⊚ |
| Embodiment 2 | ⊚ | x | ⊚ | ⊚ |
| Embodiment 3 | ○ | x | ○ | ○ |
| Embodiment 4 | ⊚ | x | ⊚ | ⊚ |
| Embodiment 5 | ⊚ | x | ⊚ | ⊚ |
| Comparative Embodiment 1 | xx | xx | xx | xx |
| Comparative Embodiment 2 | Δ | xx | ○ | ○ |
| Comparative Embodiment 3 | ○ | xx | ○ | ○ |

As mentioned above, an excellent corrosion inhibition effect can be exhibited when metal products are packaged with a laminate sheet consisting of a thermoplastic resin sheet containing water-soluble glass powder, alone or together with a vapor phase corrosion inhibitor, and a thermoplastic resin sheet containing inorganic acid metal salt(s).

Containers to contain metal products can be also formed using the above mentioned laminate sheet.

Isolation from outside air and physical strength can be improved by laminating a resin sheet with an excellent barrier property on the sheet containing inorganic acid metal salt(s).

Therefore, the present invention can solve conventional problems and significantly contributes to the industry through providing useful packaging material for metals and containers for metal products.

What is claimed is:

1. A corrosion-inhibiting laminate sheet for wrapping metal products, wherein a space is formed between the laminated sheet and the metal products, comprising:
    a first thermoplastic resin layer comprising water-soluble glass powder having a solubility of 0.1% by weight or higher in water; and
    a second thermoplastic resin layer comprising at least one inorganic acid metal salt, each of said first thermoplastic resin layer and said second thermoplastic resin layer being formed into a sheet using heat and laminated together, said laminate sheet having a strength sufficient to wrap metal products.

2. A corrosion-inhibiting laminate sheet according to claim 1, wherein said first thermoplastic resin layer further comprises a vapor phase corrosion inhibitor.

3. A corrosion-inhibiting laminate sheet according to claim 1, further comprising a barrier resin layer, in which said first thermoplastic resin layer, said second plastic thermoplastic resin layer, and said barrier resin layer are laminated in sequence.

4. A corrosion-inhibiting laminate sheet according to claim 2, further comprising a barrier resin layer, in which said first thermoplastic resin layer, said second plastic thermoplastic resin layer, and said barrier resin layer are laminated in sequence.

5. A corrosion-inhibiting laminate sheet according to claim 1, wherein said at least one inorganic acid metal salt is comprised of an inorganic acid selected from the group consisting of nitric acid, silicic acid, ortho-phosphoric acid, polyphosphoric acid, chromic acid, and carbonic acid; and metal selected from the group consisting of Na, Ca, Mg, K, and Zn.

6. A corrosion-inhibiting laminate sheet according to claim 3, wherein said barrier resin layer is comprised of a resin selected from the group consisting of polyester resins, polyamide resins, ionomer resins, uniaxially or biaxially stretched polyolefin resins, and copolymer resins.

7. A corrosion-inhibiting laminate sheet according to claim 4, wherein said barrier resin layer is comprised of a resin selected from the group consisting of polyester resins, polyamide resins, ionomer resins, uniaxially or biaxially stretched polyolefin resins, and copolymer resins.

8. A corrosion-inhibiting laminate sheet according to claim 6, wherein said barrier resin layer is comprised of polyolefin resin.

9. A corrosion-inhibiting laminate sheet according to claim 7, wherein said barrier resin layer is comprised of polyolefin resin.

10. A corrosion-inhibiting laminate sheet according to claim 1, wherein said water-soluble glass powder is formed of a $B_2O_8$—$SiO_2$—$Na_2O$ system.

11. A corrosion-inhibiting laminate sheet according to claim 10, wherein said $B_2O_8$—$SiO_2$—$Na_2O$ system contains 60 mol. % of $B_2O_8$, 20–25 mol. % of $SiO_2$, and 15–20 mol.% of $Na_2O$.

12. A corrosion-inhibiting laminate sheet according to claim 1, wherein said water-soluble glass powder has an average particle size of 100 μm or less.

13. A corrosion-inhibiting laminate sheet according to claim 5, wherein said at least one inorganic acid metal salt is sodium nitrite.

14. A container for accommodating metal products therein, wherein a space is formed between the container and the metal products, said container being formed with a corrosion-inhibiting laminate sheet comprising a first thermoplastic resin layer comprising water-soluble glass powder having a solubility of 0.1% by weight or higher in water; and a second thermoplastic resin layer comprising at least one inorganic acid metal salt, each of said first thermoplastic resin layer and said second thermoplastic resin layer being formed into a sheet using heat and laminated together, said laminate sheet having a strength sufficient to wrap a metal product.

15. A container for metal products according to claim 8, wherein said first thermoplastic resin layer further comprises a vapor phase corrosion inhibitor.

16. A container for metal products according to claim 8, wherein said corrosion-inhibiting laminate sheet further comprises a barrier resin layer, in which said first thermoplastic resin layer, said second plastic thermoplastic resin layer, and said barrier resin layer are laminated in sequence.

17. A container for metal products according to claim 9, wherein said corrosion-inhibiting laminate sheet further comprises a barrier resin layer, in which said first thermoplastic resin layer, said second plastic thermoplastic resin layer, and said barrier resin layer are laminated in sequence.

18. A container for metal products according to claim 8, wherein said first thermoplastic resin layer is closer to the interior of said container than said second thermoplastic resin layer is.

19. A container for metal products according to claim 9, wherein said first thermoplastic resin layer is closer to the interior of said container than said second thermoplastic resin layer is.

20. A container for metal products according to claim 10, wherein said barrier resin layer is the outermost layer.

21. A container for metal products according to claim 11, wherein said barrier resin layer is the outermost layer.

22. A container for metal products according to claim 8, wherein said at least one inorganic acid metal salt is comprised of an inorganic acid selected from the group consisting of nitric acid, silicic acid, ortho-phosphoric acid, polyphosphoric acid, chromic acid, and carbonic acid; and metal selected from the group consisting of Na, Ca, Mg, K, and Zn.

23. A containers for metal products according to claim 10, wherein said barrier resin layer is comprised of a resin selected from the group consisting of polyester resins, polyamide resins, ionomer resins, uniaxially or biaxially stretched polyolefin resins, and copolymer resins.

24. A containers for metal products according to claim 11, wherein said barrier resin layer is comprised of a resin selected from the group consisting of polyester resins, polyamide resins, ionomer resins, uniaxially or biaxially stretched polyolefin resins, and copolymer resins.

25. A container for metal products according to claim 23, wherein said barrier resin layer is comprised of polyolefin resin.

26. A container for metal products according to claim 24, wherein said barrier resin layer is comprised of polyolefin resin.

* * * * *

UNITED STATES PATENT AND TRADEMARK OFFICE
CERTIFICATE OF CORRECTION

PATENT NO. : 5,840,381
DATED : November 24, 1998
INVENTOR(S) : Ryochi Ohtsuka

It is certified that error appears in the above-identified patent and that said Letters Patent is hereby corrected as shown below:

Column 4/line 64, delete "$B_2O_8$" and insert --$B_2O_3$-- therefor;

Column 10/line 60, delete "$B_2O_8$" and insert --$B_2O_3$-- therefor;

Column 10/line 63, delete "$B_2O_8$" and insert --$B_2O_3$-- therefor.

Signed and Sealed this

Twentieth Day of April, 1999

Attest:

Q. TODD DICKINSON

Attesting Officer

Acting Commissioner of Patents and Trademarks